UNITED STATES PATENT OFFICE.

WILLIAM PRAMPOLINI, OF SAN LUIS POTOSI, MEXICO.

COMPOSITION OF MATTER.

SPECIFICATION forming part of Letters Patent No. 645,331, dated March 13, 1900.

Application filed December 2, 1899. Serial No. 739,037. (No specimens.)

*To all whom it may concern:*

Be it known that I, WILLIAM PRAMPOLINI, a subject of the King of Italy, residing at San Luis Potosi, Mexico, have made a certain new and useful Composition of Matter, of which the following is a specification.

My invention is in the nature of a new composition of matter designed for use as a substitute for caoutchouc in the manufacture of india-rubber goods. While residing in Mexico I have observed a shrub growing in central Mexico and known to the Indians as a "medicinal" shrub and called by the various tribes by the following names: "*Yule,*" "*Copalin,*" "*Yerba del Negro,*" "*Guayule,*" "*Jiguhite,*" and "*Hule.*" This shrub grows wild on the rolling land and attains an average height of about three feet. An examination of the shrub led me to experiment with the same with reference to ascertaining what uses might be made of it, since it grows abundantly, may be easily cultivated, roots readily from cuttings, and may be cut down two or three times a year and immediately begins to grow and shoots up again to form new wood. Although not belonging to the plants which yield milky juices, but being a comparatively-hard wood and growing as a small scrubby bush, I have found that it has within its bark and wood a very large amount of gummy matter, and upon comminuting it by cutting finely, grinding, or pounding the same and macerating it with a hydrocarbon solvent—such as gasolene, naphtha, ether of petroleum, oil of turpentine, and the like—this gum is softened and extracted from the wood and when extracted does not harden to crystallization, but, still holding a small portion of the hydrocarbon, remains as a viscid sticky mass that fulfils all of the physical conditions of crude rubber. It may be vulcanized perfectly and is superior to most india-rubber, since it is free from all mechanical impurities and needs no preliminary cracking, grinding, and washing, as does the ordinary crude rubber. The botanical name of this shrub is "*Synanthereoeas-Mexicanas,*" and it furnishes in gum the remarkable yield of forty per cent. of its own weight, while the method of its extraction and the admixture of a residual portion of the solvent give as a new composition a brownish-black viscid gum that is not only free from all mechanical impurities, but may be brought by evaporation to any desired consistency and is at once ready for use in the art without any preliminary washing and cleaning. It is, moreover, abundant and cheap. It may be treated either in a green state or dry, which latter circumstance permits it to be cut and baled and stored for any length of time or shipped without affecting its yield of gum. In preparing the composition for the market these shrubs are pounded with wooden hammers and placed in a large iron mill in order to comminute the shrub finely, and this is carried on as a continuous act. I then place the shrub, already comminuted or ground, in an iron receiver for maceration, where it is kept hermetically sealed for twelve hours with one of the hydrocarbon solvents described below. This receiver has at the center several iron or wooden beaters to stir the mass during the maceration, so that absorption may take place homogeneously. This comminuted shrub assumes a mucilaginous condition, and the receiver or receivers are put in a place heated to about 45° centigrade.

Various formulas for maceration may be employed, as follows:

Process No. 1.—Gasolene at 75°, fifty parts, and ground shrub one hundred parts.

No. 2.—Naphtha at 85°, forty parts, and ground shrub one hundred parts.

No. 3.—Ether of petroleum, forty parts, and ground shrub one hundred parts.

No. 4.—Turpentine-oil, fifty parts; ether of petroleum, twenty-five parts, and ground shrub one hundred and forty parts.

After standing until thoroughly soaked I take out from the receiver the mass in the form of mucilaginous pulp and place it in bags of canvas, and these bags are closed and placed in a hydraulic press to be pressed. The gum that comes out falls into one or more tubes that conduct it to large receivers, which contain reels to beat and stir the gum to dry out a part of the volatile solvent. In the place where these oils are volatilized there should be for the sake of economy a condensing apparatus to collect the vapors, so as to use them again in dissolving other portions of the shrub. By this process the gum that comes out is chemically pure and suitable at once for manufacture, and it forms a new composition consisting of the resin of the plant combined with a residual portion of the hydrocarbon solvent.

This class of shrub gives for a hundred pounds forty pounds of gum with a density at 15° of 0.980.

This new composition of matter I call "Twentieth century gum," and it has the following great advantages over ordinary rubber: first, saving in cost of reproducing the plant; second, saving in cost of exportation; third, saving in materials used in purifying establishments for the caoutchouc coming from South America and Africa; fourth, saving in fuel; fifth, saving in machinery; sixth, saving in time.

Having thus described my invention, what I claim, and desire to secure by Letters Patent, is—

A new composition of matter for use as a substitute for india-rubber consisting of the gummy matter of the shrub called "*Synantheroeas-Mexicanas*," known also by the Indian names of "*Yule*," "*Copalin*," "*Yerba del Negro*," "*Guayule*," "*Jiguhite*" and "*Hule*," said gummy matter being combined with the residual oil of a volatile hydrocarbon solvent substantially as herein described.

WILLIAM PRAMPOLINI.

Witnesses:
MIGUEL HERNANDEZ GENER,
ERNEST PIROVANO.